L. LEVIEN & C. B. DUNCAN.
APPARATUS FOR FIRE POLISHING GLASSWARE.
APPLICATION FILED DEC. 10, 1910.
1,038,909.
Patented Sept. 17, 1912.
2 SHEETS—SHEET 1.
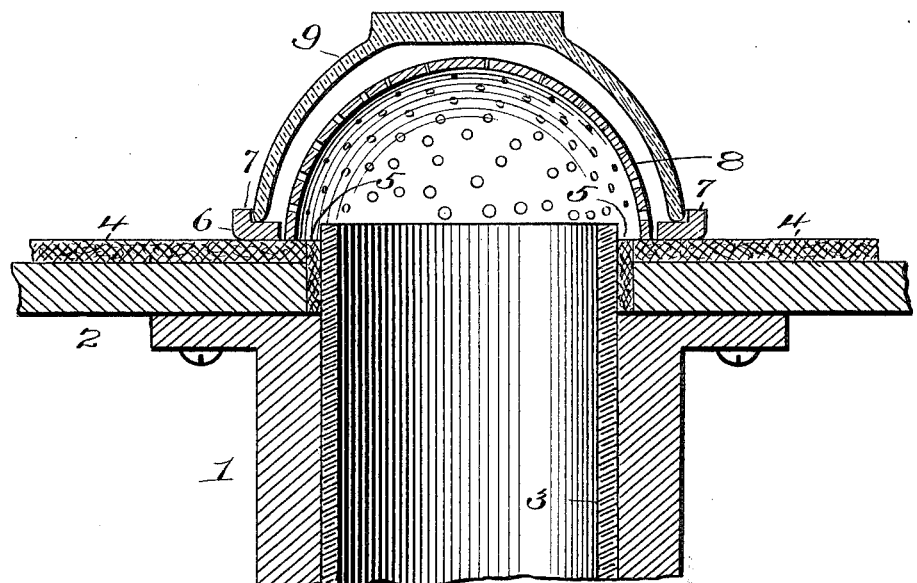
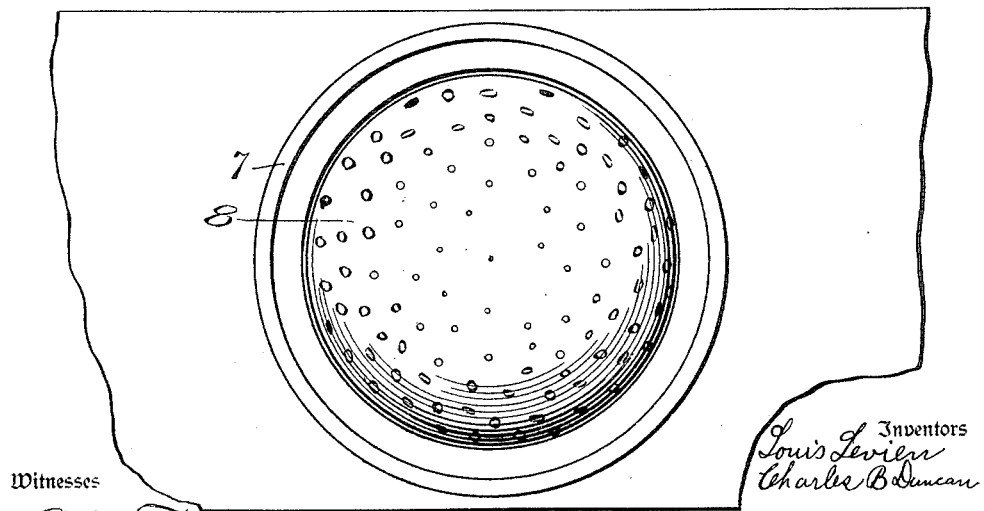

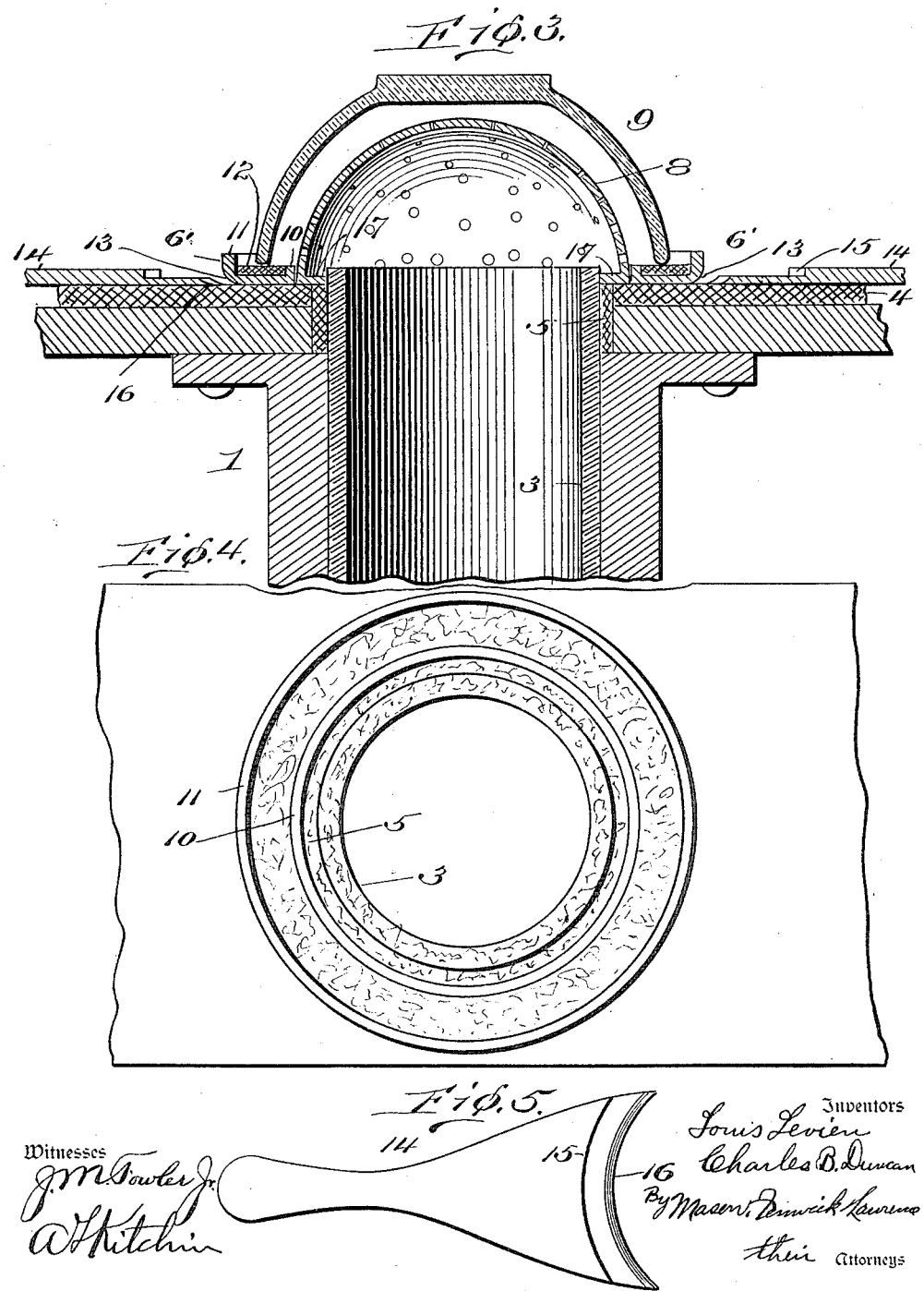

UNITED STATES PATENT OFFICE.

LOUIS LEVIEN, OF NEW YORK, N. Y., AND CHARLES B. DUNCAN, OF NESHANIC STATION, NEW JERSEY; SAID DUNCAN ASSIGNOR TO SAID LEVIEN.

APPARATUS FOR FIRE-POLISHING GLASSWARE.

1,038,909. Specification of Letters Patent. Patented Sept. 17, 1912.

Application filed December 10, 1910. Serial No. 596,672.

*To all whom it may concern:*

Be it known that we, LOUIS LEVIEN and CHARLES B. DUNCAN, citizens of the United States, and residents of New York, in the county and State of New York, and Neshanic Station, in the county of Somerset and State of New Jersey, respectively, have invented certain new and useful Improvements in Apparatus for Fire-Polishing Glassware; and we do hereby declare the following to be a full, clear, and exact description of the invention, such as will enable others skilled in the art to which it appertains to make and use the same.

This invention relates to improvements in an apparatus for polishing a glass article by reheating.

The object in view is the provision of means which will permit the reheating of a glass article either while in the mold or out of the mold with equal advantage for polishing the surface reheated.

A further object of the invention is the arrangement in an apparatus for polishing glass ware of improved means for evenly distributing heat to the surface to be glazed or polished.

With these and other objects in view the invention comprises certain novel constructions, combinations, and arrangement of parts as will be hereinafter more fully described and claimed.

In the accompanying drawings: Figure 1 is a longitudinal vertical section through an embodiment of the invention. Fig. 2 is a top plan view of the structure shown in Fig. 1. Fig. 3 is a longitudinal vertical section through a slightly modified form of the invention. Fig. 4 is a top plan view of the structure shown in Fig. 3. Fig. 5 is a plan view of one of the paddles or tongs.

In forming an apparatus embodying the invention the same is designed to heat the surface of an article, as for instance a glass article, for polishing the same. The construction involved provides means which apply heat from beneath the article so that the natural law followed by heat rising will result in applying practically all of the heat to the article without necessarily causing the flame or heated air to impinge strongly against the article.

In carrying out the invention a furnace of any desired or usual structure is connected with a table or bench of any kind, and the clay or other lining of the furnace is caused to project slightly above the table. Around and over this lining is fitted a heat spreader, preferably semi-globular in form, and provided with a large number of perforations for evenly distributing the heat, including the flame, to the article being heated. Preferably the apertures are arranged farther apart and smaller immediately above the furnace than around the sides, so that where there is a less pressure for forcing the heated air and flame through the apertures there will be larger and more numerous apertures. The article being heated is placed on a ring, either provided with an asbestos pad or not as preferred, which ring is designed to be removed by tongs or paddles when the article has been heated to the desired extent. This will result in the removal of the article without removing the deflector, so that a new ring may be supplied and a new article without the necessity of supplying a new deflector.

In order that the invention may be more clearly understood an embodiment of the same is shown in the accompanying drawings in which—

1 indicates a furnace of any desired kind secured to the under surface of a table or bench 2. The furnace 1 is provided with a lining 3, preferably of clay, which projects through the table 2, and also through a covering of asbestos 4. An asbestos ring or packing 5 may be provided if desired for preventing any undue heating of the table 2 by lining 3.

Resting on the asbestos cover 4 is a ring 6 formed with a flange 7. The ring 6 may be made of metal or other fire resisting material and is designed to fit loosely over the upper end of lining 3 and be held in place by deflector 8, hereinafter described. The heat coming up from the furnace will be directed into the heat deflecting member 8 which rests loosely on the asbestos cover 4 and is held in place by ring 6 and lining 3. The article, as for instance a glass bowl 9, is designed to rest on ring 6. The deflector 8 is designed to be of the same contour as the interior of the article 9 for causing the proper and uniform distribution of heat over the inner surface of the article. After the article 9 has been placed in position, as shown in Fig. 1, and the flame turned on in the usual manner, the inner surface of article 9 will be heated to the desired extent, and then ring 6 will be removed, together with article 9. Preferably the ring is removed quickly so as to permit a quick chilling of the heated surface of article 9. The deflector 8 may be made of asbestos or other heat resisting material, and may be made of any desired thickness.

In the form of the invention shown in Figs. 3 and 4 the article is designed to be removed quickly, either while the heat is applied or after the same has been shut off, without removing the deflector. This will cause a quick chilling action, and this form of the invention is preferable when such quick chilling action of the heated surface is desired. In this form of the invention the ring 6' is provided with flanges 10 and 11, and with an asbestos pad 12. The flange 10 is preferably made only sufficiently high for preventing the accidental removal of the pad 12, while flange 11 is made slightly higher than flange 10 so as to prevent the accidental removal of the article 9. In forming the ring 6' the flange 11 is preferably bent up therefrom so as to form a rounded corner 13 in order to permit the easy entrance beneath the ring of paddle 14. Paddle 14 is formed with an offset or shouldered portion 15 struck on the arc of a circle so as to snugly fit against the outer surface of ring 6' while the inner beveled edge 16 is also struck on the same arc in order that the same will conform to the bore of the ring 6'. The beveled portion, together with the rounded portion 13 of ring 6', permits the easy insertion of the paddle beneath ring 6' while the ring is resting on the asbestos cover 4. Arranged to surround the lining 3 of furnace 1 but within the bore of ring 6' is a deflector retaining ring 17 which extends upward and forms a deflector 8' having apertures similar to the apertures in deflector 8. This deflector is made, of course, to conform to the contour of the article 9. By the arrangement of the ring 17 the table and ring 6' are shielded to a large extent from the heat directed against the inner surface of the article 9. After an article has been placed on ring 6' the heat is turned on and the inner surface of the article heated to the desired extent. When the inner surface has been heated to the desired extent the article is quickly removed by placing paddles 14 in position and lifting the ring 6' and the article 9 from their positions over the furnace. It will be noted that the article is removed without being touched by any instrument, so that no injury will result in its removal.

The article 9 may be placed on rings 6 and 6' respectively, either with the molds removed, as shown, or with the molds still surrounding the articles.

It will be noted that by the arrangement set forth the heat is projected against the article from beneath so that by the natural action of heat in rising the heat will be evenly distributed over the surface to be heated which is not always true of devices where the flame is projected downward into the article.

What we claim is:

1. In a fire polishing apparatus, a table, a flue extending upwardly through the table for directing heat and flame in an upward direction, a perforated deflector placed over the upper end of said flue and maintaining itself in position extending above the table by its own gravity, said deflector being provided with a plurality of apertures, said apertures being smaller at the upper portion of the deflector and increasing in size toward the lower edge, and a supporting ring for supporting a dish over and to substantially inclose said deflector, said ring being formed with an upstanding flange for maintaining the dish in position.

2. In a fire polishing apparatus, a table formed with an aperture therein, a flue extending upwardly through said table and projecting slightly beyond the upper edge of the table for directing heat and flame in an upward direction through the table, a deflector arranged over the upper end of said flue formed with an inwardly extending annular flange engaging said flue for holding the deflector centered over the flue, said flue being formed with a plurality of apertures, and means for supporting an article to be polished adjacent the upper and outer surface of said deflector, whereby the heat and flame from said flue will be substantially evenly distributed to the article.

3. In a fire polishing apparatus, a table formed with an aperture therein, a tube projecting through said aperture and extending above said table designed to guide heat and flame upwardly through said table, a ring of fire resisting material surrounding the upper end of said tube and spacing the same from said table, a sheet of fire resisting material arranged on said table and formed with an aperture designed to accommodate said ring, a deflector fitting over said tube and resting against said ring and against said tube whereby the same is held by gravity in position and held against lateral displacement, said deflector being formed with a plurality of apertures, and means resting on said sheet of fire resisting material for supporting an article to be polished adjacent the exterior surface of said deflector.

4. In a fire polishing apparatus, a table, a flue extending upwardly through the table, a substantially semi-spherical deflector emplaced over the upper end of the flue and extending above the table, said deflector being provided with small openings at its top which increase in size toward its lower edge.

5. In a fire polishing apparatus, a table formed with an aperture therein, a tube fitting into said aperture for projecting heat and flame through the table, fire resisting material surrounding the upper part of said tube and covering part of said table around said aperture, a perforated deflector inclosing the upper end of said tube, a ring substantially U-shaped in cross section surrounding said deflector, and a ring of fire resisting material positioned in said first mentioned ring for supporting an article above and adjacent said deflector.

In testimony whereof we affix our signatures in presence of two witnesses.

LOUIS LEVIEN.
CHARLES B. DUNCAN.

Witnesses:
HUGO MOCK,
B. ROMAN.

Copies of this patent may be obtained for five cents each, by addressing the "Commissioner of Patents, Washington, D. C."